United States Patent [19]

van Sluys

[11] Patent Number: 4,679,185

[45] Date of Patent: Jul. 7, 1987

[54] PIVOTAL-ARM DEVICE FOR A DISC SCANNING UNIT

[75] Inventor: Robert N. J. van Sluys, Eindhoven, Netherlands

[73] Assignee: U.S. Philips Corporation, New York, N.Y.

[21] Appl. No.: 756,537

[22] Filed: Jul. 19, 1985

[30] Foreign Application Priority Data

Apr. 22, 1985 [NL] Netherlands ......................... 8501154

[51] Int. Cl.⁴ ............................. G11B 3/10; G11B 3/32
[52] U.S. Cl. ................................................. 369/255
[58] Field of Search ...................... 369/255, 244, 215

[56] References Cited

U.S. PATENT DOCUMENTS 4,403,316 9/1983 van der Veerdonk ............. 369/255

FOREIGN PATENT DOCUMENTS 1181361 2/1970 United Kingdom ................ 369/255

Primary Examiner—Steven L. Stephan
Attorney, Agent, or Firm—F. Brice Faller

[57] ABSTRACT

A pivotal-arm device (15) for a disc scanning unit (13) for recording and/or reading information comprises a deck plate (3A), a pivotal arm (25) carrying the scanning unit, and pivotal-arm bearing means. The pivotal arm bearing means comprise two bearings disposed on opposite sides of the pivotal arm, at least one of the bearings comprising two bearing members (31, 33), a spherical bearing element, which cooperates with these bearing members, and a viscous medium. At least one of the bearing members has a concave bearing surface (33A), between which bearing surface and the bearing element a gap (35) is formed, which gap widens towards the edge of said bearing surface and which contains said viscous medium. A resilient element (39), which is secured to the deck plate, urges the bearings towards one another.

8 Claims, 4 Drawing Figures

PIVOTAL-ARM DEVICE FOR A DISC SCANNING UNIT

BACKGROUND OF THE INVENTION

The invention relates to a pivotal-arm device for a scanning unit for recording and/or reading information on a disc-shaped record carrier. The device comprises a deck plate, a pivotal arm having means for securing the scanning unit, and pivotal-arm bearing means which pivotally supports the pivotal arm for pivotal movement about a pivotal axis, the bearing means comprising two bearings, disposed on opposite sides of the pivotal arm, a resilient element, which is secured to the deck plate, supports one of the bearings and urges the bearings towards one another.

Such a pivotal-arm device is known from European Patent Application No. 0074131 corresponding to U.S. Pat. No. 4,403,316 (hereby incorporated by reference). The known device is employed for moving and positioning an optical scanning unit relative to an optical disc and allows the scanning unit to make a limited pivotal movement. This pivotal movement is effected about a pivotal axis which extends parallel to the axis of rotation of a turntable for the optical disc, which turntable is supported in the stationary deck plate. The optical disc may be a video disc, an optical storage disc, or an optical audio disc. Two pre-stressed ball-bearings support the pivotal arm without play relative to the deck plate. The two ball-bearings, of which one bearing is secured directly to the deck plate and the other bearing is secured indirectly to the deck plate by means of a blade spring, should be aligned accurately relative to one another during assembly of the pivotal-arm device. Mounting the ball-bearings is therefore an intricate and time-consuming operation, which in combination with the rather expensive ball-bearings leads to an expensive pivotal-arm bearing means. Further, it has been found that during operation the known pivotal-arm device, which is arranged in a servo-control loop, has the disadvantage that undamped vibrations are produced in the pivotal-arm bearing means, which vibrations can set the deck plate with the optical disc and/or the pivotal arm in motion to such an extent that the servo control is disturbed.

SUMMARY OF THE INVENTION

It is the object of the invention to provide a pivotal-arm device using inexpensive resonance-free pivotal arm bearing means having such properties that only those relative movements of the pivotal arm and the deck plate can occur which do not lead to impermissible or uncontrollable displacements of the scanning units relative to the recording surface of the disc-shaped record carrier.

To this end at least one of the bearings comprises a spherical bearing element and two facing bearing members which are disposed substantially perpendicularly to the pivotal axis and which each have a cup-shaped recess to receive a part of the bearing element. One of the bearing members is secured to the pivotal arm and at least one of the bearing members has a concave bearing surface between which bearing surface and the bearing element a gap is formed, which gap widens towards the edge of said concave bearing surface and which contains a viscous lubricant.

Pivotal-arm devices may be employed in various types of equipment, such as home-entertainment equipment, portable equipment, and equipment intended for use in cars. Depending on the use of the pivotal-arm device the deck plate may be subjected to forces which vary under operating conditions and which cause the deck plate to move. The movements of the deck plate may be distinguished into axial movements and lateral movements. The pivotal-arm bearing means in the pivotal-arm device in accordance with the invention and the pivotal-arm bearing means in the known device transmit the axial movements of the deck plate to the pivotal arm in the same or substantially the same way and are therefore not discussed. Roughly the lateral movements may be distinguished into rapid or high-frequency movements, caused by, for example, an impulse-like shock to which the deck plate is subjected or an unbalance in the rotating record carrier, and slow or low-frequency movements. The pivotal-arm bearing means can be dimensioned in such a way that at least for the high-frequency movements the bearing means is stiff and without play so that these movements are transmitted from the deck plate to the pivotal arm. The pivotal arm, which like the known pivotal arm is preferably balanced, performs a movement of the same magnitude and in the same direction as the disc-shaped record carrier on the deck plate. For this reason and because the pivotal-arm bearing means does not exhibit any resolvent rise symptoms this will not affect the position of the scanning unit and the information surface of the record carrier relative to each other. For low-frequency lateral movements of the deck plate the pivotal-arm bearing means is comparatively compliant, so that the bearing means then exhibits some play. However, owing to the damping action of the viscous medium in the pivotal-arm bearing means and because the bearing means itself does not exhibit any resonance phenomena, the displacement of the pivotal arm relative to the deck plate is only minimal.

The effects of the pivotal-arm bearing means in accordance with the invention are of particular interest in pivotal-arm devices whose pivotal arm is arranged in an automatic control loop which corrects minor errors in the tracking of the information track in the recording surface by pivotal movements of the pivotal arm. Such a control loop can provide a correction for low-frequency vibrations of the scanning unit. However, control loops have only a limited bandwidth, so that in general they cannot provide a satisfactory correction for high-frequency vibrations of the scanning unit relative to the deck plate. As already stated, the constructional steps in accordance with the invention provide ample possibilities of preventing a high-frequency movement relative to the deck plate from being transmitted to the pivotal arm with the scanning unit. By a suitable dimensioning of the gap width in the bearing and by a suitable choice of the visious medium, which may be oil or grease, the relevant bearing can be given such properties that lateral displacements of the deck plate only result in movements of the pivotal arm relative to the deck plate which are such that they can be corrected.

The invention may also be employed in pivotal-arm devices for moving and positioning a magnetic scanning unit or magnetic head over a magnetic storage disc, such as a floppy disc. Such a pivotal-arm device is known from German Gebrauchsmuster No. 8204617. In the pivotal-arm device described therein the magnetic head is carried by a pivotal arm having a pivotal axis which extends transversely of the axis of rotation of the storage disc which is in its operating condition. Thus, the pivotal arm can be pivoted away from and towards the storage disc from an in-operative position, in which the storage disc can be mounted or removed, to an operative position, in which the magnetic head can scan the magnetic disc. In this known construction the pivotal arm is supported in a translatable frame for moving the pivotal arm and the magnetic head parallel to the record carrier. The bearing means comprises two bearings, which each comprise a round shaft end and a bearing block. The two shaft ends form part of a common metal shaft and the two bearings blocks are each secured to a movable arm of the frame, an axially directed spring force urging the bearing blocks against the shaft ends. In comparison with the bearing means in the pivotal-arm device in accordance with the invention this known bearing means has several disadvantages. For example, the accurate manufacture of a metal shaft with two round shaft ends is rather laborious, in particular if the dimensional tolerances are small, specifically the length of the shaft and the diameter of the round shaft ends generally have very small permissible dimensional deviations. Another disadvantage is that the metal shaft with the round shaft ends co-operates with the bearing blocks without a lubricant, so that comparatively large friction forces may occur in the bearings. Moreover, this known bearing construction is not capable of supporting the pivotal arm in the deck plate in the desired manner because of the absence of a viscous medium.

In a preferred embodiment of the invention, the scanning unit is an optical scanning unit comprising a lens system which is movable along an optical axis, the pivotal arm carries coil means for exerting electromagnetic pivotal forces in a plane transverse to the pivotal axis, and a permanent-magnetic stator has permanent-magnetic stator means secured to the deck plate and which cooperate with the coil means via an air gap. The two bearings are identical, one of the bearing members of one bearing being mounted in the deck plate and one of the bearing members of the other bearing being secured to the resilient element.

In this embodiment the movable lens system serves for automatically focusing and maintaining the focusing of a radiation beam to form a read spot on the optical disc. For the purpose of automatically following the recording track on the optical disc, this pivotal arm is arranged in an automatic control loop which corrects tracking errors by small pivotal movements of the pivotal arm. Tracking errors may arise as a result of an eccentric position of the tracks relative to the axis of rotation of the rotating optical disc, for example owing to an imperfect centring of the disc on the turntable. Further, tracking errors may be caused by random effects, such as for example transverse forces exerted on the pivotal-arm bearing means. If the tracking error is caused by a slow movement of the pivotal arm, it will be eliminated by the automatic control system. However, in the event of tracking errors caused by rapid movements of the pivotal arm, the control system is no longer capable of correcting these errors owing to its limited bandwidth, which may lead to uncontrolled displacements of the read spot. In the present embodiment the bearing means of the pivotal arm ensures that such errors cannot occur under normal operating conditions.

The automatic control loops intended here generally have a bandwidth around 1000 Hz. Slow and rapid movements of the deck plate may be defined in relation to this bandwidth. Slow movements then have frequencies within the bandwidth and rapid movements have higher frequencies. A suitable dimensioning of the bearings, filled with the appropriate viscous medium, results in a pivotal-arm bearing means which give rise to a movement of the pivotal arm relative to the deck plate only in the case of slow lateral displacements of the deck plate. The viscous medium in the gaps of the bearings ensures that no resonance effects occur, so that the movements of the pivotal arm are corrected by the control system without any problems. In the case of rapid lateral movements of the deck plate the viscous medium presents such a resistance to deformation that the bearings behave as stiff bearings and the pivotal arm performs the same movements as the deck plate. As a result of this, the position of the read spot relative to the recording surface of the record carrier which is moved with the deck plate, does not change. In addition, the viscous medium again ensures that no resonances are produced.

The pivotal-arm bearing means has no axial play, which is favourable for the bandwidth of the control system. Moreover, it has been found that the pivotal-arm bearing means is self-centring, so that the pivotal arm tends to return to a neutral position. In view of the mounting of the lens system in the pivotal arm and in view of the limited axial displacements which the lens system can perform for the purpose of focusing it is important that in the above-mentioned pivotal arm device in accordance with the invention, the pivotal arm is situated exactly at a predetermined distance from a reference surface of the deck plate. The construction in accordance with the invention solves this problem in a very attractive and cheap manner.

The spherical bearing elements may be balls of the same type as used in ball-bearings. These balls are cheap, have very accurate dimensions and are commercially available in suitable quantities. Moreover, if the bearing member which is mounted in the deck plate and the bearing members which are situated on opposite sides of the pivotal arm are injection-moulded from a plastic together with the deck plate, the pivotal-arm device in accordance with the invention is very suitable for mass production.

Another embodiment is characterized in that the two bearing members of the bearing each have a concave bearing surface, between which bearing surface and the bearing element a gap is formed, which gap widens towards the edge of said bearing surface and which contains a lubricant. In this embodiment the bearing has a slightly smaller radial stiffness than a bearing having only one such gap because of this restrains the possibility of rotation of the bearing element relative to the two bearing members; however, this is outweighed by a further improvement of the damping properties of the bearing. Which construction is adopted for a specific purpose depends on inter alia the desired damping of the bearing and the minimum permissible radial stiffness of the bearing.

DETAILED DESCRIPTION OF THE INVENTION

Figure 1:
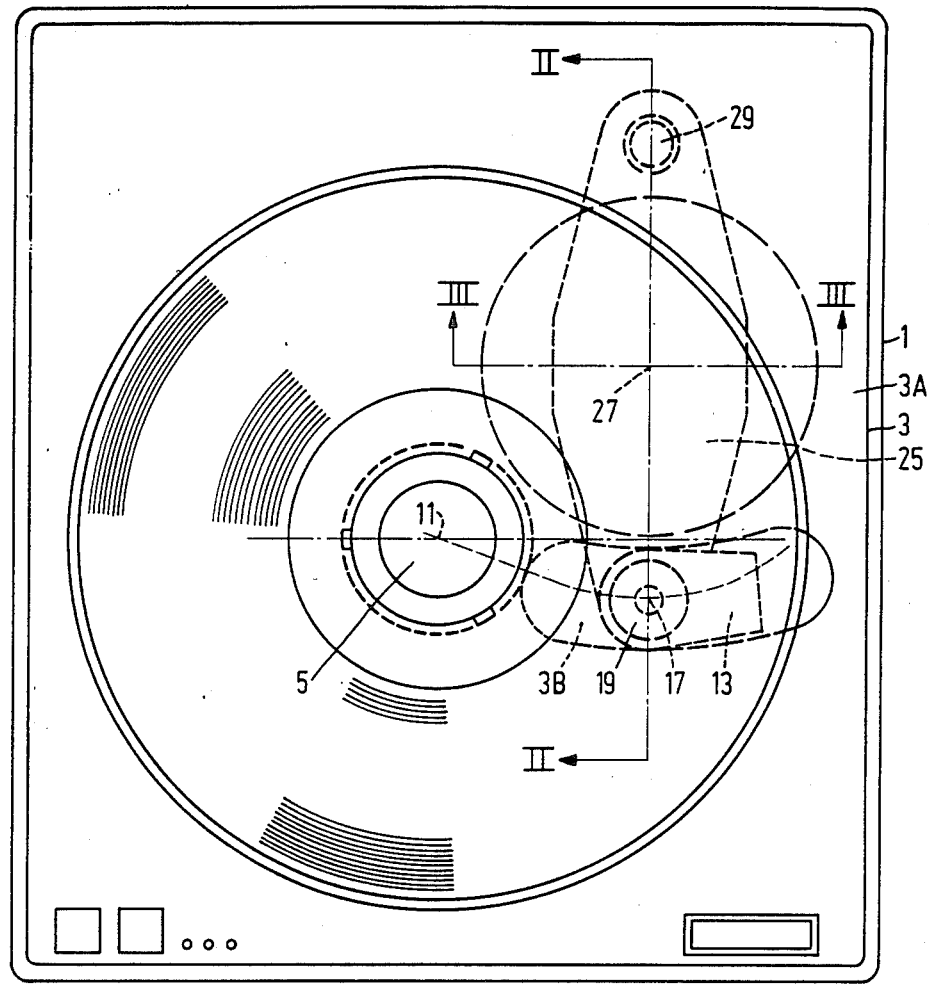
FIG. 1 is a plan view of an optical-disc player in which the preferred embodiment is utilized.
Figure 2:
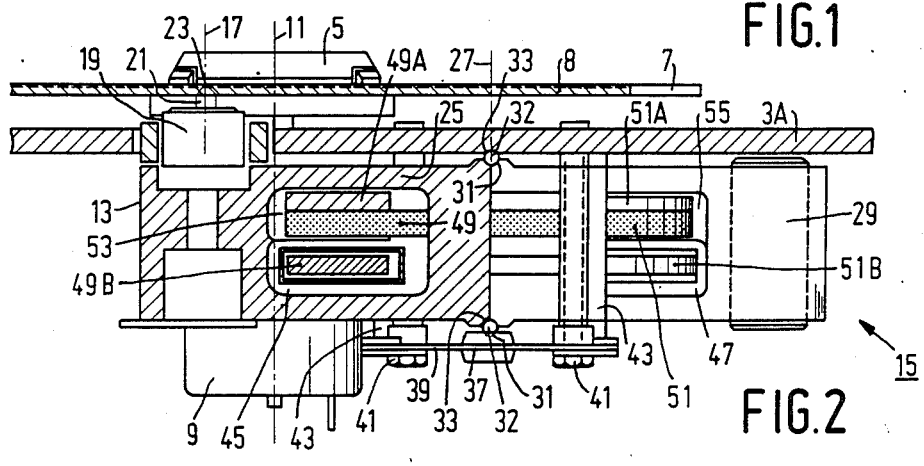
FIG. 2 shows a part of the optical-disc player in a sectional view taken on the lines II—II in FIG. 1, a part of the pivotal-arm device being shown in side view.

FIGS. 1 and 2 show an optical audio disc player comprising a housing 1 and a stationary casing 3 with a deck plate 3A. The turntable 5, which is journalled in the deck plate 3, supports an optical audio disc 7 having a recording surface 8. The turntable 5 with the disc 7 can be rotated about an axis of rotation 11 by an electric motor 9. The optical disc 7 can be read in reflection by means of an optical scanning unit 13 of a pivotal-arm device 15. The optical scanning unit 13 comprises a lens system 19, which is movable along an optical axis 17, a light source in the form of a semiconductor laser, and optical and opto-electronic means necessary for reading and processing the optical information read from the disc 7. The lens system 19 concentrates a laser beam 21 to form a read spot 23 on the recording surface 8. The lens system 19 can be supported and driven in a manner as described in Netherlands Patent Application No. 8403052 corresponding to U.S. Pat. No. 4,615,585, hereby incorporated by reference. The present optical-disc player comprises two automatic control systems, namely a focusing control system and a tracking control system. The focusing control system serves for automatically keeping the read spot 23 focused on the recording surface and for automatically correcting possible deviations. The tracking control system serves for automatically correcting deviations in the position of the read spot 23 relative to the information tracks in the recording surface. Since the construction and the operation of the control systems and the scanning unit are irrelevant to the present invention, they will not be described in more detail.

The pivotal-arm device 15 comprises deck plate 3A of the casing 3 and a plastic pivotal arm 25, which is pivotable about a pivotal axis 27. Moulded on its first end, the pivotal arm 25 carries optical scanning unit 13 comprising the lens system 19 which projects through an aperture 3B in the deck plate 3A. A second end of the pivotal arm 25 carries a counterweight 29.

Figure 3:
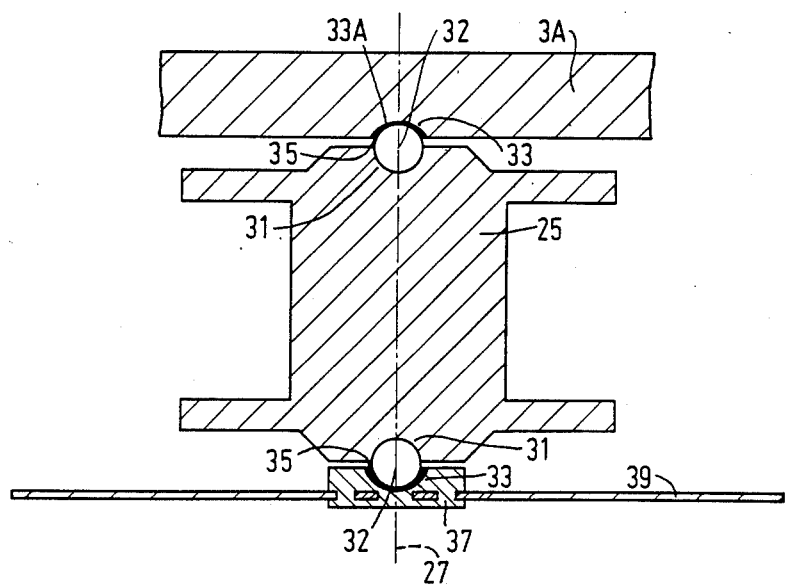
FIG. 3 shows the pivotal arm and the pivotal-arm bearing means in an enlarged-scale sectional view taken on the lines III—III in FIG. 1.
Figure 4:
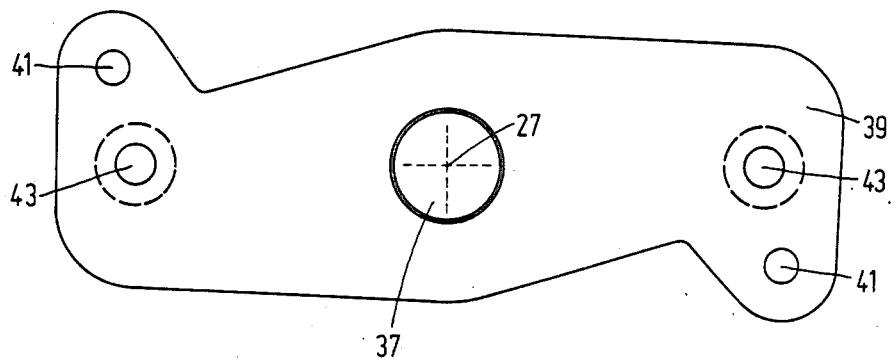
FIG. 4 is an underneath view of the resilient element of FIG. 3.

A pivotal-arm bearing means, which supports the pivotal arm 25 for pivotal movement about the pivotal axis 27, comprises two bearings situated on opposite sides of the pivotal arm 25 (see also FIGS. 3 and 4.) Each of the bearings comprises two bearing members 31 and 33 between which a metal spherical ball 32 and a viscous medium are present. The two bearing members 31 are injection-molded of plastic integrally with pivotal arm 25. The plastic may be a glass-fibre-reinforced or carbon-fibre-reinforced phenolic resin. The bearing members 31 each have a recess which is bounded by a spherical surface and which has a radius equal to the radius of the ball 32, for example 1.5 mm, so that these recesses function as seats for the balls 32. The bearing member 33 are each formed with a concave bearing surface 33A having a radius which is larger than the radius of the balls 32. The difference in radius is approximately 10–50 μm. As a result of this, a gap 35 is formed between the bearing members 33 and the balls 32, which gap widens towards the edge of the concave bearing surface and which contains a viscous medium, for example a silicone oil having a viscosity between 200 and 5000 centistokes. One of the bearing members 33 is integral with deck plate 3A of the casing 3 and the other bearing member 33 is situated in a plastic support 37 which is secured to a blade spring 39. In the present embodiment the deck plate 3A of the casing 3 is injection-moulded plastic and the plastic support 37 is moulded on the metal blade spring 39. Thus, the two bearing members 33 may readily be formed by injection-moulding. By means of two screws 43 the blade spring 39 is secured to the deck plate 3A and bears on two upright members 41 of the casing 3 in an axially prestressed condition thereby eliminating axial play in the bearings.

For the radial displacement of the read spot 23 over the recording surface 8 of the optical disc 7 there are provided two coils 45 and 47 and permanent magnets 49 and 51 (see FIG. 2). The magnets 49 and 51 cooperate with the coils 45 and 47 via an air gap. The coils are wound in such a way and the magnets are magnetized in such a way that each coil exerts an electromagnetic pivotal force in a plane perpendicular to the pivotal axis 27. The coils 45 and 47 are substantially rectangular and are arranged in through-holes 53 and 55 in the pivotal arm 25. The axially magnetized magnet 49 and 51 are shaped as circular segments and also extend through the holes 53 and 55 in the pivotal arm 25. The magnets 49 and 51 are non-rotatably secured to the casing 3. For this purpose the magnets 49 and 51 are glued to a semicircular iron yoke member 49A and 51A respectively. Identical semicircular yoke members 49B and 51B extend through the coils 45 and 47. In a manner not shown, for example by means of bolts and spacers, the yoke members 49A, 51A, 49B and 51B are secured to the deck plate 3A of the casing 3.

What is claimed is:

1. A pivotal-arm device for a scanning unit for recording and/or reading information in/from a recording surface of a disc-shaped record carrier, which device comprises
   a deck plate,
   a pivotal arm comprising means for securing the scanning unit,
   pivotal-arm bearing means which pivotally supports the pivotal arm for pivotal movement about a pivotal axis, the pivotal-arm bearing means comprising two bearings, which are disposed on opposite sides of the pivotal arm, and
   a resilient element, which is secured to the deck plate, for supporting one of the bearing and for urging the bearings towards one another,
   characterized in that at least one of the bearings comprises a spherical bearing element and two facing bearing members which each have a recess to receive a part of the bearing element, one of the bearing members being disposed on the pivotal arm and at least one of the bearing members having a concave bearing surface having a radius which is larger than that of the spherical bearing element receives therein so that a gap is formed between said concave bearing surface and the bearing element, which gap widens towards the edge of said concave bearing surface and contains a viscous medium.

2. A pivotal arm device as claimed in claim 1, in which
   the scanning unit is an optical scanning unit comprising a lens system which is movable along an optical axis, the pivotal arm carries coil means for exerting electromagnetic pivotal forces in a plane transverse to the pivotal axis, and a permanent-magnetic stator comprising a permanent-magnetic stator means which are secured to the deck plate and which cooperate with the coil means via an air gap, characterized in that the two bearings are identical, one of the bearing members of one bearing being mounted in the deck plate and one of the bearing members of the other bearing being secured to the resilient element.

3. A pivotal-arm device as claimed in claim 2, characterized in that the bearing member mounted in the deck plate is injection-molded of plastic integrally with the deck plate.

4. A pivotal-arm device as claimed in claim 2, characterized in that the bearing members disposed on the pivotal arm are injection-molded of plastic integrally with the pivotal arm.

5. A pivotal arm device as claimed in claim 3, characterized in that the bearing members disposed on the pivotal arm are injection-molded of plastic integrally with the pivotal arm.

6. A pivotal-arm device as in claim 1 wherein only one bearing member of said at least one of the bearings has a concave bearing surface having a radius larger than that of the spherical bearing element received therein, the other bearing member of said at least one of the bearings having a recess bounded by a spherical surface which has a radius equal to that of the spherical bearing element received therein.

7. A pivotal-arm device as in claim 2 wherein the bearing member in the deck plate and the bearing member secured to the resilient element both have concave bearing surfaces with radii larger than that of the respective bearing elements received therein.

8. A pivotal-arm device as in claim 2 wherein the bearing members disposed on the pivotal arm both have recesses bounded by spherical surfaces with the radii equal to that of the respective spherical bearing elements received therein.

* * * * *